United States Patent
Kanungo et al.

(10) Patent No.: US 9,283,795 B1
(45) Date of Patent: Mar. 15, 2016

(54) IMAGING MEMBER FOR OFFSET PRINTING APPLICATIONS

(71) Applicant: XEROX CORPORATION, Norwalk, CT (US)

(72) Inventors: Mandakini Kanungo, Penfield, NY (US); Anton Grigoryev, Saratov (RU); Phillip J. Wantuck, Rochester, NY (US); David J. Gervasi, Pittsford, NY (US); Santokh S. Badesha, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/574,037

(22) Filed: Dec. 17, 2014

(51) Int. Cl.
| | |
|---|---|
| G03G 5/147 | (2006.01) |
| B41N 1/08 | (2006.01) |
| B41C 1/10 | (2006.01) |
| G02B 1/04 | (2006.01) |
| G02B 5/20 | (2006.01) |

(52) U.S. Cl.
CPC ... B41N 1/08 (2013.01); B41C 1/10 (2013.01); G02B 1/04 (2013.01); G02B 5/208 (2013.01)

(58) Field of Classification Search
CPC  G03G 5/147; G03G 5/14704; G03G 5/14713
See application file for complete search history.

(56) References Cited

U.S. PATENT DOCUMENTS

| | | | |
|---|---|---|---|
| 2002/0090235 A1* | 7/2002 | Broddin | G03G 15/161 399/307 |
| 2010/0129123 A1* | 5/2010 | Natori | G03G 15/2057 399/333 |
| 2014/0060359 A1 | 3/2014 | Kanungo et al. | |
| 2014/0060362 A1 | 3/2014 | Kanungo et al. | |

OTHER PUBLICATIONS

Kanungo et al., "Methods for Forming Functionalized Carbon Black with Amino-Terminated Polyfluorodimethylsiloxane for Printing," U.S. Appl. No. 14/041,508, filed Sep. 30, 2013.
Kanungo et al., "Fluoroelastomers for Marking System Components, Including Grafted Fluorinated Polymers," U.S. Appl. No. 13/931,983, filed Jun. 30, 2013.

* cited by examiner

*Primary Examiner* — Hoa V Le
(74) *Attorney, Agent, or Firm* — MH2 Technology Law Group LLP

(57) ABSTRACT

An imaging member surface layer including between 55% and 95% fluorosilicone, between 5% and 20% infrared-absorbing material by weight, between 1% and 5% silica, between 0.15% and 0.35% catalyst and between 10% and 18% crosslinker by weight, based on the total weight of the surface layer. The surface layer has a thickness between 10 microns and 1 millimeter and a surface tension energy of 22 dynes/cm or less and a polar components of 5 dynes or less.

20 Claims, 2 Drawing Sheets

IMAGING MEMBER FOR OFFSET PRINTING APPLICATIONS

FIELD OF DISCLOSURE

The disclosure relates imaging members having a surface layer as described herein, and more particularly, to fluoroelastomer compositions including fluorosilicones, infrared-absorbing materials, and silica usable to form surface layers for imaging members.

BACKGROUND

Offset lithography is a common type of printing method. In a typical lithographic process a printing plate, which may be a flat plate, the surface of a cylinder, or belt, etc., is formed to have "image regions" formed of a hydrophobic/oleophilic material and "non-image regions" formed of a hydrophilic/oleophobic material. The image regions correspond to the areas on the final print (i.e., the target substrate) that are occupied by a printing or marking material such as ink, whereas the non-image regions correspond to the areas on the final print that are not occupied by said marking material. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system. The offset cylinder is covered with a conformable coating or sleeve with a surface that can conform to the texture of the target substrate, which may have surface peak-to-valley depth somewhat greater than the surface peak-to-valley depth of the imaging plate. Also, the surface roughness of the offset blanket cylinder helps to deliver a more uniform layer of printing material to the target substrate free of defects such as mottle. Sufficient pressure is used to transfer the image from the offset cylinder to the target substrate. Pinching the target substrate between the offset cylinder and an impression cylinder provides this pressure.

Typical lithographic and offset printing techniques utilize plates which are permanently patterned, and are therefore useful only when printing a large number of copies of the same image (i.e. long print runs), such as magazines, newspapers, and the like. However, they do not permit creating, and printing a new pattern from one page to the next without removing and replacing the print cylinder and/or the imaging plate (i.e., the technique cannot accommodate true high speed variable data printing wherein the image changes from impression to impression, for example, as in the case of digital printing systems) Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

Fluoroelastomers and fluoropolymers have been used in a variety of printing systems over the years. For example, fluoroelastomers have been used to form the reimaginable surface in variable data lithography systems. Fluoroelastomers are attractive for their thermal and chemical properties, as well as their release properties when used with specific toner and printing ink materials. Accordingly, there is a need for new fluoroelastomers compositions that enable development of new systems for offset printing and/or variable data lithography, as well as for other printing applications.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Additional goals and advantages will become more evident in the description of the figures, the detailed description of the disclosure, and the claims.

The foregoing and/or other aspects and utilities embodied in the present disclosure may be achieved by providing a surface layer fluoroelastomer, including between 55% and 95% fluorosilicone by weight, based on a total weight of the surface layer fluoroelastomer; between 5% and 20% infrared-absorbing material by weight, based on the total weight of the surface layer fluoroelastomer; between 1% and 5% silica by weight, based on the total weight of the surface layer fluoroelastomer; between 0.15% and 0.35% catalyst by weight, based on the total weight of the surface layer fluoroelastomer; and between 10% and 18% crosslinker by weight, based on the total weight of the surface layer fluoroelastomer.

In another embodiment, the surface layer fluoroelastomer includes between 83% and 93% fluorosilicone, between 7 and 15% infrared-absorbing material by weight, between 1% and 4% silica, between 0.2% and 0.3% catalyst, wherein the catalyst is a Pt catalyst, and between 12% and 16% crosslinker.

In another embodiment, the infrared-absorbing material comprises at least one of carbon black, a metal oxide, carbon nanotubes, graphene, graphite, and carbon fibers.

In another embodiment, the surface layer fluoroelastomer includes about 20% carbon black, about 1.15% silica, about 0.25% of a 14.3% Pt Catalyst in TFT, and about 15% crosslinker.

In another embodiment, the carbon black has a sulphur content of 0.3% or less.

In another embodiment, the silica comprises a hydrophobic silica.

In another embodiment, the surface layer fluoroelastomer comprises about 1.15% hydrophobic silica.

In another embodiment, the carbon black has an average particle size of between 2 nanometers and 10 microns, and wherein the silica has an average particle size of between 10 nanometers and 0.2 microns.

In another embodiment, at least 75% of siloxane units in the fluorosilicone are fluorinated.

In another embodiment, the carbon black is not agglomerated within the fluorosilicone.

The foregoing and/or other aspects and utilities embodied in the present disclosure may be achieved by providing an imaging member comprising a surface layer, wherein the surface layer includes between 55% and 95% fluorosilicone by weight, based on the total weight of the surface layer; between 5% and 20% infrared-absorbing material by weight, based on the total weight of the surface layer; between 1% and 5% silica by weight, based on the total weight of the surface layer; between 0.15% and 0.35% catalyst by weight, based on the total weight of the surface layer; and between 10% and 18% crosslinker by weight, based on the total weight of the surface layer, wherein the surface layer has a thickness between 10 microns and 1 millimeter, and a surface tension energy of 22 dynes/cm or less and a polar components of 5 dynes or less.

In another embodiment, the surface layer includes between 83% and 93% fluorosilicone, between 7% and 15% infrared-absorbing material by weight, between 1% and 4% silica, between 0.2% and 0.3% catalyst, wherein the catalyst is a Pt catalyst, and between 12% and 16% crosslinker.

In another embodiment, the infrared-absorbing material comprises at least one of carbon black, a metal oxide, carbon nanotubes, graphene, graphite, and carbon fibers.

In another embodiment, the surface layer comprises hydrophobic silica, and wherein the carbon black has a sulphur content less than 0.3%.

The foregoing and/or other aspects and utilities embodied in the present disclosure may be achieved by providing a method of forming an imaging member, including flow coating a surface layer on an substrate; and curing the coated surface layer at an elevated temperature, wherein the surface layer includes between 55% and 95% fluorosilicone by weight, based on the total weight of the surface layer; between 5% and 20% infrared-absorbing material by weight, based on the total weight of the surface layer; between 1% and 5% silica by weight, based on the total weight of the surface layer; between 0.15% and 0.35% catalyst by weight, based on the total weight of the surface layer; and between 10% and 18% crosslinker by weight, based on the total weight of the surface layer, wherein the surface layer has a thickness between 10 microns and 1 millimeter, and a surface tension energy of 22 dynes/cm or less and a polar components of 5 dynes or less.

In another embodiment, the surface layer includes between 83% and 93% fluorosilicone, between 7% and 15% infrared-absorbing material by weight, between 1% and 4% silica, between 0.2% and 0.3% catalyst, wherein the catalyst is a Pt catalyst, and between 12% and 16% crosslinker, wherein the infrared-absorbing material comprises at least one of carbon black, a metal oxide, carbon nanotubes, grapheme, graphite, and carbon fibers.

In another embodiment, the surface layer comprises a hydrophobic silica, and wherein the carbon black has a sulphur content of 0.30% or less.

In another embodiment, the carbon black has an average particle size of between 2 nanometers and 10 microns, and wherein the silica has an average particle size of between 10 nanometers and 0.2 microns.

In another embodiment, at least 75% of siloxane units in the fluorosilicone are fluorinated.

In another embodiment, the carbon black is not agglomerated within the fluorosilicone.

BRIEF DESCRIPTION OF THE DRAWINGS

These and/or other aspects and advantages in the embodiments of the disclosure will become apparent and more readily appreciated from the following description of the various embodiments, taken in conjunction with the accompanying drawings of which.

Figure 1:
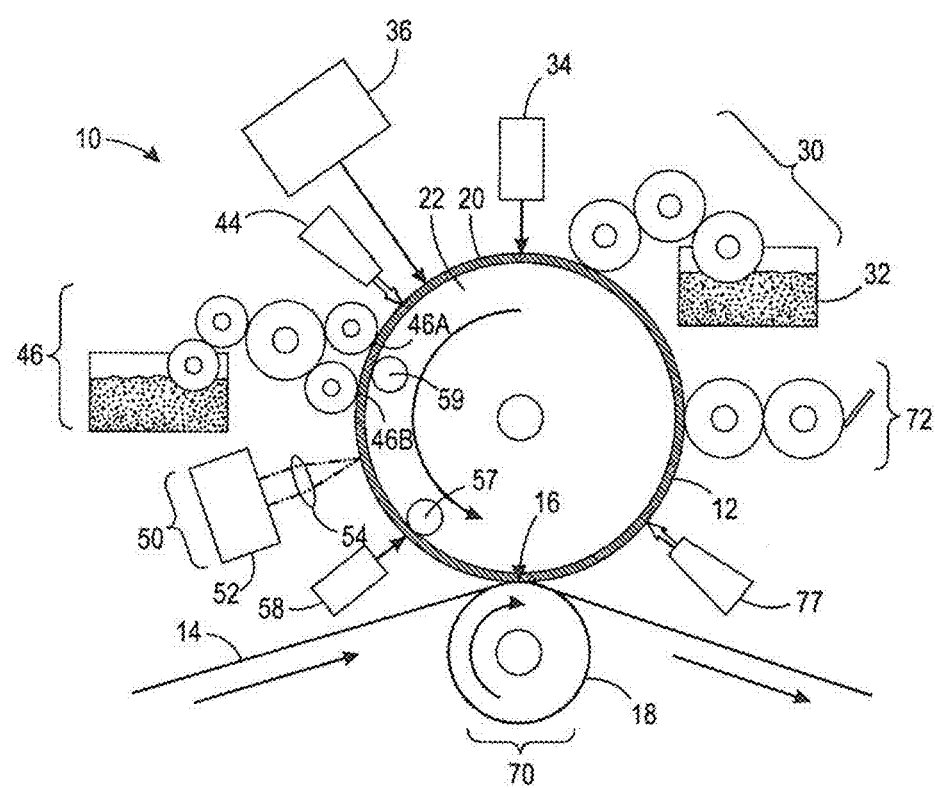
FIG. 1 illustrates an offset printing system.

It should be noted that some details of the drawings have been simplified and are drawn to facilitate understanding of the present teachings rather than to maintain strict structural accuracy, detail, and scale.

The drawings above are not necessarily to scale, with emphasis instead generally being placed upon illustrating the principles in the present disclosure. Further, some features may be exaggerated to show details of particular components. These drawings/figures are intended to be explanatory and not restrictive.

DETAILED DESCRIPTION

Reference will now be made in detail to the various embodiments in the present disclosure. The embodiments are described below to provide a more complete understanding of the components, processes and apparatuses disclosed herein. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, etc. addition, throughout the specification, the meaning of "a," "an," and "the" include plural references. The meaning of "in" includes "in" and "on".

All physical properties that are defined hereinafter are r measured at 20° to 25° Celsius unless otherwise specified. The term "room temperature" refers to 25° Celsius unless otherwise specified.

When referring to any numerical range of values herein, such ranges, are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

While the fluoroelastomer composition is discussed herein in relation to ink-based digital offset printing or variable data lithographic printing systems, embodiments of the fluoroelastomer composition, or methods of manufacturing imaging members using the same, may be used for other applications, including printing applications other than ink-based digital offset printing or variable data lithographic printing systems.

FIG. 1 illustrates an offset printing system. As illustrated in FIG. 1, an offset printing system may include an imaging member 12. In one embodiment, imaging member comprises a substrate 22 and a reimageable surface layer 20. The surface layer is the outermost layer of the imaging member, i.e. the layer of the imaging member furthest from the substrate 22. In one embodiment, the surface layer 20 comprises a fluoroelastomer composition. As shown here, the substrate 22 is in the shape of a cylinder; however, the substrate may also be in a belt form, etc. Note that in some embodiments, the surface layer is a different material compared to the substrate, as they may serve different functions.

As illustrated in FIG. 1, in one embodiment, the imaging member 12 rotates counterclockwise and starts with a clean surface. Disposed at a first location is a dampening fluid subsystem 30, which uniformly wets the surface with dampening fluid 32 to form a layer having a uniform and controlled thickness. In some embodiments, the dampening fluid layer is between 0.15 micrometers and about 1.0 micrometers in thickness, is uniform, and is without pinholes. As explained further below, the composition of the dampening fluid aids in leveling and layer thickness uniformity. A sensor 34, such as an in-situ non-contact laser gloss sensor or laser contrast sensor, may be used to confirm the uniformity of the layer. Such a sensor can be used to automate the dampening fluid subsystem 30.

At optical patterning subsystem 36, the dampening fluid layer may be exposed to an energy source (e.g. a laser) that selectively applies energy to portions of the layer to imagewise evaporate the dampening fluid and create a latent "negative" of the ink image that is desired to be printed on the receiving substrate. Image areas are created where ink is desired, and non-image areas are created where the dampening fluid remains. In some embodiments, an optional air knife 44 controls airflow over the surface layer 20 for the purpose of maintaining clean dry air supply, a controlled air temperature, and reducing dust contamination prior to inking. Next, in some embodiments, an ink composition is applied to the imaging member using inker subsystem 46. Inker subsystem 46 may consist of a "keyless" system using an anilox roller to meter an offset ink composition onto one or more forming rollers 46A, 46B. The ink composition is applied to the image areas to form an ink image.

In some embodiments, a rheology control subsystem 50 is used to partially cure or tack the ink image. This curing source may be, for example, an ultraviolet light emitting diode (UV-LED) 52, which can be focused as desired using optics 54. Another way of increasing the cohesion and viscosity employs cooling of the ink composition. This could be done, for exam pie, by blowing cool air over the reimageable surface from jet 58 after the ink composition has been applied but before the ink composition is transferred to the final substrate. Alternatively, a heating element 59 could be used near the inker subsystem 46 to maintain a first temperature and a cooling element 57 could be used to maintain a cooler second temperature near the nip 16.

According to some embodiments, the ink image is then transferred to the target or receiving substrate 14 at transfer subsystem 70. This is accomplished by passing a recording medium or receiving substrate 14, such as paper, through the nip 16 between the impression roller 18 and the imaging member 12.

Finally, in some embodiments, the imaging member should be cleaned of any residual ink or dampening fluid. Most of this residue can be easily removed quickly using an air knife 77 with sufficient air flow. Removal of any remaining ink can be accomplished at cleaning subsystem 72.

In some embodiments, the dampening fluid is hydrophobic (i.e. non-aqueous) and the ink somewhat hydrophilic (having a small polar component). This combination can be used with a surface layer 20 using various embodiments of the fluoroelastomer composition. Generally speaking, in some embodiments, a variable lithographic printing system can be described as comprising an ink composition, a dampening fluid, and an imaging member surface layer, wherein the dampening fluid has a surface energy alpha-beta coordinate which is within the circle connecting the alpha-beta coordinates for the surface energy of the ink and the surface energy of the imaging member surface layer. In other embodiments, the dampening fluid has a total surface tension greater than 10 dynes/cm and less than 75 dynes/cm with a polar component of less than 50 dynes/cm. In some embodiments, the dampening fluid has a total surface tension greater than 15 dynes/cm and less than 30 dynes/cm with a polar component of less than 5 dynes/cm.

According to some embodiments, by choosing the proper chemistry, it is possible to devise a system where both the ink and the dampening fluid will wet the imaging member surface layer 20, but the ink and the dampening fluid will not mutually wet each other. A system can also be designed so that it is energetically favorable for dampening fluid in the presence of ink residue to actually lift the ink residue off of the imaging member surface layer 20 by having a higher affinity for wetting the surface in the presence of the ink. In other words, the dampening fluid could remove microscopic background defects (e.g. <1 µm radius) from propagating in subsequent prints.

In one embodiment, the dampening fluid should have a slight positive spreading coefficient so that the dampening fluid wets the imaging member surface. The dampening fluid should also maintain a spreading coefficient in the presence of ink, or in other words the dampening fluid has a closer surface energy value to the imaging member surface than the ink does. This causes the imaging member surface to value wetting by the dampening fluid compared to the ink, and permits the dampening fluid to lift off any ink residue and reject ink from adhering to the surface where the laser has not removed dampening fluid. In one embodiment, the ink should wet the imaging member surface in air with a roughness enhancement factor (i.e. when no dampening fluid is present on the surface). It should be noted that, in some embodiments, the surface may have a roughness of less than 1 µm when the ink is applied at a thickness of 1 to 2 µm. In one embodiment, the dampening fluid does not wet the ink in the presence of air. In other words, fracture at the exit inking nip should occur where the ink and the dampening fluid interface, not within the dampening fluid itself. This way, dampening fluid will not tend to remain on the imaging member surface after ink has been transferred to a receiving substrate. Finally, in some embodiments, it is also desirable that the ink and dampening fluid are chemically immiscible such that only emulsified mixtures can exist. Though the ink and the dampening fluid may have alpha-beta coordinates close together, often choosing the chemistry components with different levels of hydrogen bonding can reduce miscibility by increasing the difference in the Hanson solubility parameters.

The role of the dampening fluid is to provide selectivity in the imaging and transfer of ink to the receiving substrate. In one embodiment, when an ink donor roll in the ink source of FIG. 1 contacts the dampening fluid layer, ink is only applied to areas on the imaging member that are dry, i.e. not covered with dampening fluid.

In some embodiments, it is contemplated that the dampening fluid comprises a mixture of octamethylcyclotetrasiloxane (D4) and decamethylcyclopentasilaxane (D5). Most silicones are derived from D4 and D5, which are produced by the hydrolysis of the chlorosilanes produced in the Rochow process. The ratio of D4 to D5 that is distilled from the hydrolysate reaction is generally about 85% D4 to 15% D5 by weight, and this combination is an azeotrope. In some embodiments, the dampening fluid may comprise D4 alone or substantially D4 alone.

In particular embodiments, it is contemplated that the dampening fluid comprises a mixture of octamethylcyclotetrasiloxane (D4) and hexamethylcyclotrisiloxane (D3), the D3 being present in an amount of up to 30% by total weight of the D3 and the D4. The effect of this mixture is to lower the effective boiling point for a thin layer of dampening fluid.

These volatile hydrofluoroether liquids and volatile silicone liquids have a low heat of vaporization, low surface tension, and good kinematic viscosity. In particular, it should be noted that according to some embodiments, the fluorosilicone in the imaging member surface layer of the present disclosure does not swell when D4 is used as the fountain solution, and shows excellent wetting with D4.

The ink compositions contemplated for use with the present disclosure generally include a colorant and a plurality of selected curable compounds. The curable compounds can be cured under ultraviolet (UV) light to fix the ink in place on the final receiving substrate. As used herein, the term "colorant" includes pigments, dyes, quantum dots, mixtures thereof, and the like. Dyes and pigments have specific advantages. Dyes have good solubility and dispersibility within the ink vehicle. Pigments have excellent thermal and light-fast performance. The colorant is present in the ink composition in any desired amount, and is typically present in an amount of from about 10 to about 40 weight percent (wt %), based on the total weight of the ink composition, or from about 20 to about 30 wt %. Various pigments and dyes are known in the art, and are commercially available from suppliers such as Clariant, BASF, and Ciba, to name just a few.

The ink compositions may have a viscosity of from about 5,000 to about 300,000 centipoise at 25° Celsius and a shear rate of 5 sec$^{-1}$, including a viscosity of from about 15,000 to about 250,000 cps. The ink compositions may have a viscosity of from about 2,000 to about 90,000 centipoise at 25° Celsius and a shear rate of 50 sec$^{-1}$, including a viscosity of from about 5,000 to about 65,000 cps. The shear thinning index, or SHI, is defined in the present disclosure as the ratio of the viscosity of the ink composition at two different shear rates, here 50 sec$^{-1}$ and 5 sec$^{-1}$. This may be abbreviated as SHI (50/5). The SHI (50/5) may be from about 0.10 to about 0.60 for the ink compositions of the present disclosure, including from about 0.35 to about 0.55. These ink compositions may also have a surface tension of at least about 25 dynes/cm at 25° Celsius, including from about 25 dynes/cm to about 40 dynes/cm at 25° Celsius. These ink compositions possess many desirable physical and chemical properties. They are compatible with the materials with which they will come into contact, such as the dampening fluid, the surface layer of the imaging member, and the final receiving substrate. They also have the requisite wetting and transfer properties. They can be UV-cured and fixed in place. They also have a good viscosity; conventional offset inks usually have a viscosity above 50,000 cps, which is too high to use with nozzle-based inkjet technology. In addition, one of the most difficult issues to overcome is the need for cleaning and waste handling between successive digital images to allow for digital imaging without ghosting of previous images. These inks are designed to enable very high transfer efficiency instead of ink splitting, thus overcoming many of the problems associated with cleaning and waste handling. The ink compositions of the present disclosure do not gel, whereas regular offset inks made by simple blending do gel and cannot be used due to phase separation.

The imaging member 12 plays multiple roles in the variable data lithography printing process, which include: (1) wetting with the fountain solution, (2) creation of the latent image, (3) inking with the offset ink, and (4) enabling the ink to lift off and be transferred to the receiving substrate. Some desirable qualities for the imaging member, particularly its surface, include high tensile strength to increase the useful service lifetime of the imaging member. In some embodiments, the surface layer 20 should also weakly adhere to the ink, yet be wettable with the ink, to promote both uniform inking of image areas and to promote subsequent transfer of the ink from the surface to the receiving substrate. Finally, some solvents have such a low molecular weight that they inevitably cause some swelling of imaging member surface layers. Wear can proceed indirectly under these swell conditions by causing the release of near infrared laser energy-absorbing particles at the imaging member surface, which then act as abrasive particles. Accordingly, in some embodiments, the imaging member surface layer has a low tendency to be penetrated by solvent.

In some embodiments, the surface layer 20 may have a thickness of about 10 microns (μm) to about 1 millimeter (mm), depending on the requirements of the overall printing system. In other embodiments, the surface layer 20 has a thickness of about 20 microns (μm) to about 100 microns (μm). In one embodiment, the thickness of the surface layer 20 is of about 40 microns (μm) to about 60 microns (μm).

In some embodiments, the surface layer 20 may have a surface energy of 22 dynes/cm or less with a polar component of 5 dynes/cm or less. In other embodiments, the surface layer 20 has a surface tension of 21 dynes/cm or less with a polar component of 2 dynes/cm or less or a surface tension of 19 dynes/cm or less with a polar component of 1 dyne/cm or less.

Some embodiments contemplate methods of manufacturing the imaging member surface layer 20. For example, in one embodiment, the method includes depositing a surface layer fluoroelastomer composition upon a mold; and curing the surface layer fluoroelastomer composition at an elevated temperature.

According to one embodiment, an imaging member 12 is formed by coating a substrate 22 with a fluoroelastomer composition as surface layer 20 and curing at high temperature. In one embodiment, the surface layer fluoroelastomer composition comprises a fluorosilicone, an infrared-absorbing filler, and silica. In other embodiments, the surface layer fluoroelastomer composition may further comprise a catalyst, such as a platinum catalyst, and a crosslinker. In one embodiment, the surface layer fluoroelastomer composition is flow coated unto the substrate 22 through spraying nozzles and cured at an elevated temperature. For example, the surface layer fluoroelastomer composition may be deposited on a rotating substrate 22 at a spindle speed between 5 to 300 RPM, with a coating head traverse rate between 2 to 60 mm/min, a coat dispensing rate between 6-40 grams/min, and at a relative humidity at 25° C. of between 40 to 65%.

The curing may be performed at an elevated temperature of from about 110° Celsius to about 160° Celsius. This elevated temperature is in contrast to room temperature. The curing may occur for a time period of from about 15 minutes to about 4 hours. In some embodiments, the curing time period is between 15 minutes and 1 hour. In one embodiment, the curing time period is about 30 minutes.

As described above, the surface layer 20 may comprise a fluoroelastomer composition. In one embodiment, the formulation for the fluoroelastomer composition includes a fluorosilicone, an infrared-absorbing filler, and silica. In other embodiments, the fluoroelastomer composition may further comprise a catalyst, such as a platinum catalyst, and a crosslinker, such as an XL-150 crosslinker, commercially available from NuSil.

The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking.

The term "fluorosilicone" as used herein refers to polyorganosiloxanes having a backbone formed from silicon and oxygen atoms, and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit addition crosslinking. When the crosslinking is complete, such groups become part of the backbone of the overall fluorosilicone. The side chains of the polyorganosiloxane can also be alkyl or aryl. Fluorosilicones are commercially available, for example CF1-3510 from NuSil or SLM(n-27) from Wacker.

In some embodiments, at least 75% of the siloxane units are fluorinated in the fluorosilicones. The percentage of fluorinated siloxane units can be determined by considering that each silicon atom contains two possible sidechains. The percentage is calculated as the number of sidechains having at least one fluorine atom divided by the total number of sidechains (i.e. twice the number of silicon atoms).

In one embodiment, the fluoroelastomer composition includes between 55% and 95% by weight fluorosilicone based on the total weight of the fluoroelastomer composition. In another embodiment, the fluoroelastomer composition includes between 85% and 93% by weight fluorosilicone. In yet another embodiment, the fluoroelastomer composition includes about 73% by weight fluorosilicone based on the total weight of the fluoroelastomer composition.

The infrared-absorbing filler is able to absorb energy from the infra-red portion of the spectrum (having a wavelength of from about 750 nm to about 1000 nm). This aids in efficient evaporation of the fountain solution. In embodiments, the infrared-absorbing filler may be carbon black, a metal oxide such as iron oxide (FeO), carbon nanotubes, graphene, graphite, or carbon fibers. The filler may have an average particle size of from about 2 nanometers to about 10 microns. In one embodiment, the filler may have an average particle size of from about 20 nanometers to about 5 microns. In another embodiment, the filler has an average particle size of about 100 nanometers.

In one embodiment, the fluoroelastomer composition includes between 5% and 20% by weight infrared-absorbing filler based on the total weight of the fluoroelastomer composition. In another embodiment, the fluoroelastomer includes between 7% and 15% by weight infrared-absorbing filler. In yet another embodiment, the fluoroelastomer includes about 20% by weight infrared-absorbing filler based on the total weight of the fluoroelastomer composition.

In one embodiment, the infrared-absorbing filler is carbon black. In another embodiment, the infrared-absorbing filler is a low-sulphur carbon black, such as Emperor 1600 (available from Cabot). In one embodiment, a sulphur content of the carbon black is 0.3% or less. In another embodiment, the sulphur content of the carbon black is 0.15% or less.

In one embodiment, the fluoroelastomer composition includes silica. For example, in one embodiment, the fluoroelastomer composition includes between 1% and 5% by weight silica based on the total weight of the fluoroelastomer composition. In another embodiment, the fluoroelastomer includes between 1% and 4% by weight silica. In another embodiment, the fluoroelastomer includes between 2% and 4% by weight silica. In yet another embodiment, the fluoroelastomer includes about 1.15% by weight silica based on the total weight of the fluoroelastomer composition.

In one embodiment, the silica is a hydrophobic silica. In some embodiments, hydrophobic silica disperses better than the hydrophilic silica within the fluoroelastomer composition and does not agglomerate. The silica may have an average particle size of from about 10 nanometers to about 0.2 microns. In one embodiment, the silica may have an average particle size of from about 50 nanometers to about 0.1 microns. In another embodiment, the silica has an average particle size of about 20 nanometers.

In one embodiment, the fluoroelastomer composition includes a catalyst. In one embodiment, the catalyst is a platinum (Pt) catalyst, for example a 14.3% Pt in trfluorotoluene (14.3% Pt catalyst in TFT). In one embodiment, fluoroelastomer composition includes between 0.15% and 0.35% by weight of a catalyst based on the total weight of the fluoroelastomer composition. In another embodiment, the fluoroelastomer includes between 0.2% and 0.30% by weight catalyst. In yet another embodiment, the fluoroelastomer includes about 0.25% by weight catalyst based on the total weight of the fluoroelastomer composition.

In one embodiment, the fluoroelastomer composition includes a crosslinker. In some embodiments, the fluoroelastomer composition includes fluorosilicone crosslinker. In one embodiment, the crosslinker is a XL 150 crosslinker from NuSil Corporation. For example, in one embodiment, the fluoroelastomer composition includes between 10% and 18% by weight of a crosslinker based on the total weight of the fluoroelastomer composition. In another embodiment, the fluoroelastomer includes between 12% and 16% by weight crosslinker. In yet another embodiment, the fluoroelastomer includes about 15% by weight crosslinker based on the total weight of the fluoroelastomer composition.

Aspects of the present disclosure may be further understood by referring to the following examples. The examples are illustrative, and are not intended to be limiting embodiments thereof. Example 1 illustrates the process of making a fluoroelastomer according to one embodiment of the present disclosure.

Example 1

100 grams of SML(n=27) fluorosilicone (vinyl terminated trifluoropropyl methylsiloxane polymer available commercially from Wacker) was mixed with 30.4 grams of carbon black (Emperor 1600 available commercially from Cabot), 1.75 grams of Silica, and 250 grams trifluorotoluene (TFT) solvent in a paint shaker with stainless steel beads for 3 hours. SML(n=27) fluorosilicone is illustrated in formula 1 below.

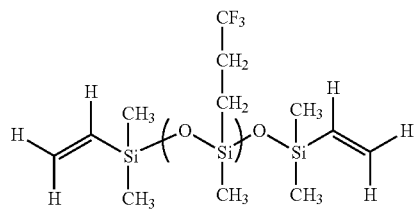

Formula 1

Mixing in the paint shaker helps to disperse the carbon black finely in the fluorosilicone. After mixing, 4200 microliters (μL) of Pt catalyst (14.3% in TFT) was added and then further mixed. Pt catalyst in TFT is illustrated in Formula 2 below,

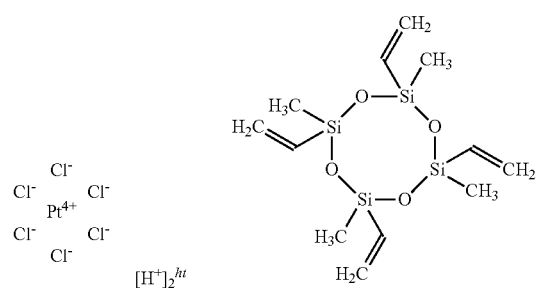

Formula 2

20 grams of crosslinker (XL-150 commercially available from NuSil) was then added and mixed. The viscosity of the mixture was then adjusted to 280 cP by addition of TFT. XL-150 is illustrated in Formula 3 below. The crosslinking mechanism is illustrated in Formula 4 below.

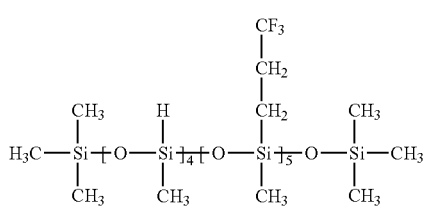

Formula 3

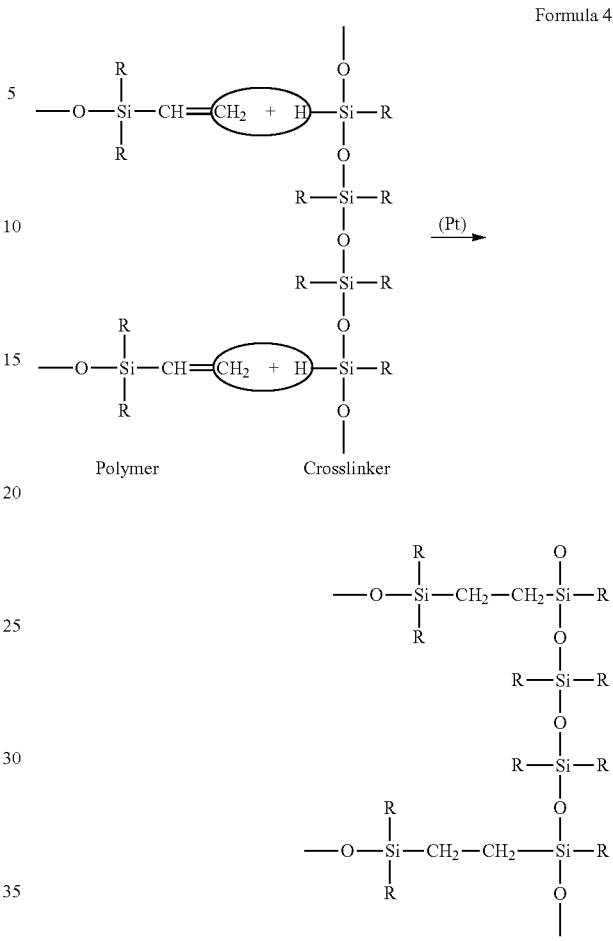

Formula 4

Mechanism of crosslinking
R = —CH$_3$ or —CH$_2$—CH$_2$—CF$_3$

The mixture was then degassed in vacuum to remove the air bubbles to create a flow-coatable elastomer used in the making of imaging members according to some embodiments as described above, After curing, the non-crosslinked extractable was around 2-3%.

Figure 2:
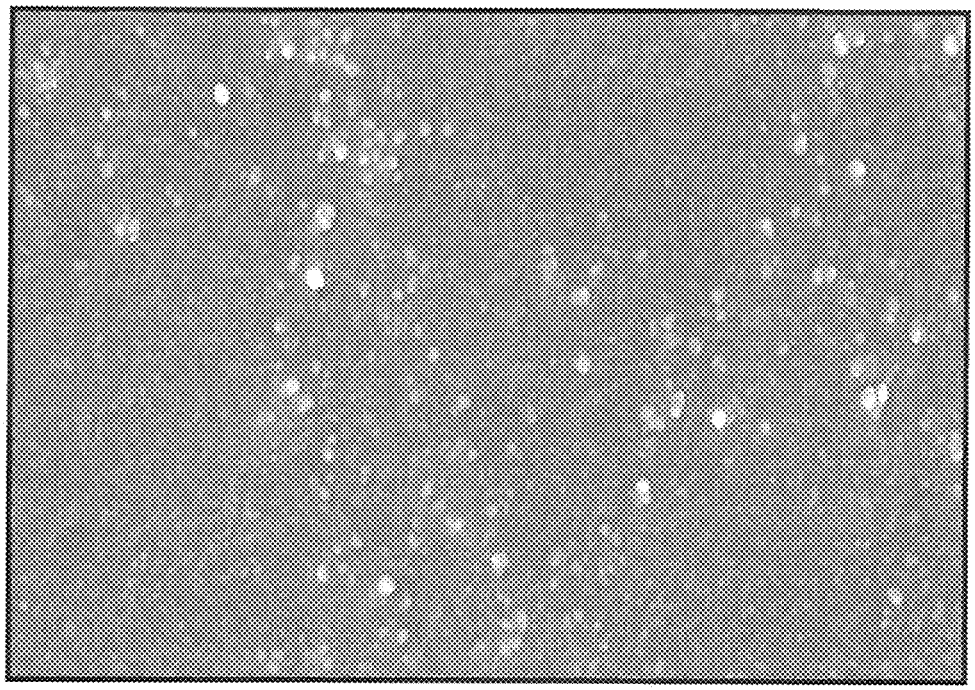
FIG. 2 is a scanning electron micrograph of a fluoroelastomer composition.

FIG. 2 illustrates carbon black dispersion in the fluorosilicone composition. In particular, FIG. 2 illustrates a 9982 5.0 kV 7.2 mm×50.0 k scanning electron micrograph of an embodiment of the fluoroelastomer composition. As illustrated in FIG. 2, the fluoroelastomer composition of example 1 has an excellent dispersion quality. The uniform dispersion of the carbon black in the fluorosilicone matrix makes it flow coatable.

The inventors have found that fluoroelastomer composition embodiments according to the disclosure have excellent flow-coatability characteristics. Without being limited to a particular theory, the inventors have surprisingly discovered that the inclusion of small amounts of silica in the fluoroelastomer composition improves the uniform dispersion of the infrared-absorbing material within the fluorosilicone matrix and improve the flow-coating characteristics of the fluoroelastomer composition. In one embodiment, the carbon black is not agglomerated within the fluorosilicone matrix. As illustrated in FIG. 2, the carbon black is very uniformly distributed in the fluorosilicone matrix with an average particle size of 50 nm. In some embodiments, carbon black dispersion is very important for flow coating of smooth fluorosilicone surface thin films. Agglomeration of carbon black leads to rough surface coating which is undesirable for image quality in the print process. In other embodiments, the uniform distribution of carbon black also helps in uniform laser absorption and the uniform evaporation of the fountain solution that is essential for the high resolution image formation.

Further disclosed are processes for variable lithographic printing. In one embodiment, a printing process includes applying a fountain solution/dampening fluid to an imaging member comprising an imaging member surface layer; forming a latent image by evaporating the fountain solution from selective locations on the imaging member surface layer to form hydrophobic non-image areas and hydrophilic image areas; developing the latent image by applying an ink composition to the hydrophilic image areas; and transferring the developed latent image to a receiving substrate.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. A surface layer fluoroelastomer, comprising:
   between 55% and 95% fluoro ° silicone by weight, based on a total weight of the surface layer fluoroelastomer;
   between 5% and 20% infrared-absorbing material by weight, based on the total weight of the surface layer fluoroelastomer;
   between 1% and 5% silica by weight, based on the total weight of the surface layer fluoroelastomer;
   between 0.15% and 0.35% catalyst by weight, based on the total weight of the surface layer fluoroelastomer; and
   between 10% and 18% crosslinker by weight, based on the total weight of the surface layer fluoroelastomer.

2. The surface layer fluoroelastomer of claim 1, comprising:
   between 83% and 93% fluorosilicone,
   between 7% and 15% infrared-absorbing material by weight,
   between 1% and 4% silica,
   between 0.2% and 0.3% catalyst, wherein the catalyst is a Pt catalyst, and between 12% and 16% crosslinker.

3. The surface layer fluoroelastomer of claim 2, wherein the infrared-absorbing material comprises at least one of carbon black, a metal oxide, carbon nanotubes, graphene, graphite, and carbon fibers.

4. The surface layer fluoroelastomer of claim 1, comprising:
   about 20% carbon black,
   about 1.15% silica,
   about 0.25% of a 14.3% Pt Catalyst in TFT, and
   about 15% crosslinker.

5. The surface layer fluoroelastomer of claim 3, wherein the carbon black has a sulphur content of 0.3% or less.

6. The surface layer fluoroelastomer of claim 5, wherein the silica comprises a hydrophobic silica.

7. The surface layer fluoroelastomer of claim 6, wherein the surface layer fluoroelastomer comprises about 1.15% hydrophobic silica.

8. The surface layer fluoroelastomer of claim 7, wherein the carbon black has an average particle size of between 2 nanometers and 10 microns, and wherein the silica has an average particle size of between 10 nanometers and 0.2 microns.

9. The surface layer fluoroelastomer of claim 8, wherein at least 75% of siloxane units in the fluorosilicone are fluorinated.

10. The surface layer fluoroelastomer of claim 9, wherein the carbon black is not agglomerated within the fluorosilicone.

11. An imaging member comprising a surface layer, wherein the surface layer comprises:
    between 55% and 95% fluorosilicone by weight, based on the total weight of the surface layer;
    between 5% and 20% infrared-absorbing material by weight, based on the total weight of the surface layer;
    between 1% and 5% silica by weight, based on the total weight of the surface layer;
    between 0.15% and 0.35% catalyst by weight, based on the total weight of the surface layer; and
    between 10% and 18% crosslinker by weight, based on the total weight of the surface layer,
    wherein the surface layer has a thickness between 10 microns and 1 millimeter, and a surface tension energy of 22 dynes/cm or less and a polar components of 5 dynes or less.

12. The imaging member of claim 11, wherein the surface layer comprises:
    between 83% and 93% fluorosilicone,
    between 7% and 15% infrared-absorbing material by weight,
    between 1% and 4% silica,
    between 0.2% and 0.3% catalyst, wherein the catalyst is a Pt catalyst, and
    between 12% and 16% crosslinker.

13. The imaging member of claim 12, wherein the infrared-absorbing material comprises at least one of carbon black, a metal oxide, carbon nanotubes, graphene, graphite, and carbon fibers.

14. The imaging member of claim 13, wherein the surface layer comprises hydrophobic silica, and wherein the carbon black has a sulphur content less than 0.3%.

15. A method of forming an imaging member, comprising:
    flow coating a surface layer on an substrate; and
    curing the coated surface layer at an elevated temperature, wherein the surface layer comprises:
    between 55% and 95% fluorosilicone by weight, based on the total weight of the surface layer;
    between 5% and 20% infrared-absorbing material by weight, based on the total weight of the surface layer;
    between 1% and 5% silica by weight, based on the total weight of the surface layer;
    between 0.15% and 0.35% catalyst by weight, based on the total weight of the surface layer; and
    between 10% and 18% crosslinker by weight, based on the total weight of the surface layer,
    wherein the surface layer has a thickness between 10 microns and 1 millimeter, and a surface tension energy of 22 dynes/cm or less and a polar components of 5 dynes or less.

16. The method of claim 15, wherein the surface layer comprises:
    between 83% and 93% fluorosilicone,
    between 7% and 15% infrared-absorbing material by weight,
    between 1% and 4% silica,
    between 0.2% and 0.3% catalyst, wherein the catalyst is a Pt catalyst, and
    between 12% and 16% crosslinker, wherein the infrared-absorbing material comprises at least one of carbon black, a metal oxide, carbon nanotubes, graphene, graphite, and carbon fibers.

17. The method of claim 16, wherein the surface layer comprises a hydrophobic silica, and wherein the carbon black has a sulphur content of 0.30% or less.

18. The method of claim 17, wherein the carbon black has an average particle size of between 2 nanometers and 10 microns, and wherein the silica has an average particle size of between 10 nanometers and 0.2 microns.

19. The method of claim 15, wherein at least 75% of siloxane units in the fluorosilicone are fluorinated.

20. The method of claim 17, wherein the carbon black is not agglomerated within the fluorosilicone.

* * * * *